United States Patent [19]

Boyko et al.

[11] 4,003,788
[45] Jan. 18, 1977

[54] NUCLEAR FUEL ELEMENTS SEALED BY ELECTRIC WELDING

[75] Inventors: Eugene S. Boyko, Monroeville; Joseph Campbell, Pittsburgh; Roger J. Wiggins, Allison Park, all of Pa.

[73] Assignee: Westinghouse Electric Corporation, Pittsburgh, Pa.

[22] Filed: June 27, 1974

[21] Appl. No.: 483,601

Related U.S. Application Data

[62] Division of Ser. No. 96,153, Dec. 8, 1970, Pat. No. 3,842,238.

[52] U.S. Cl. .................. 176/79; 176/68; 176/83
[51] Int. Cl.² .......................... G21C 3/10
[58] Field of Search .......... 176/68, 74, 79, 83

[56] References Cited

UNITED STATES PATENTS

| | | | |
|---|---|---|---|
| 3,231,476 | 1/1966 | Thome | 176/83 X |
| 3,274,070 | 9/1966 | Vanslager | 176/79 X |
| 3,466,226 | 9/1969 | Lass | 176/74 X |
| 3,683,148 | 8/1972 | Boyko et al. | 176/79 X |
| 3,769,158 | 10/1973 | Winders | 176/79 X |
| 3,816,248 | 6/1974 | Cayol et al. | 176/79 X |
| 3,842,238 | 10/1974 | Boyko et al. | 176/79 X |

FOREIGN PATENTS OR APPLICATIONS

| | | | |
|---|---|---|---|
| 1,209,673 | 1/1966 | Germany | 176/79 |
| 1,086,819 | 6/1959 | Germany | 176/83 |
| 1,905,790 | 9/1969 | Germany | 176/73 |

*Primary Examiner*—Samuel W. Engle
*Assistant Examiner*—Peter A. Nelson
*Attorney, Agent, or Firm*—R. T. Randig

[57] ABSTRACT

A nuclear-fuel assembly has an end plug and is sealed except for a small diameter axial bore in the plug. A welding electrode of the same material as the plug has an end ground to a point. The tapered end is then inserted into the bore. Before the bore is sealed the assembly is filled with an inert-gas at high pressure. An electric welding current is then directed through the electrode and the plug to seal the bore.

1 Claim, 5 Drawing Figures

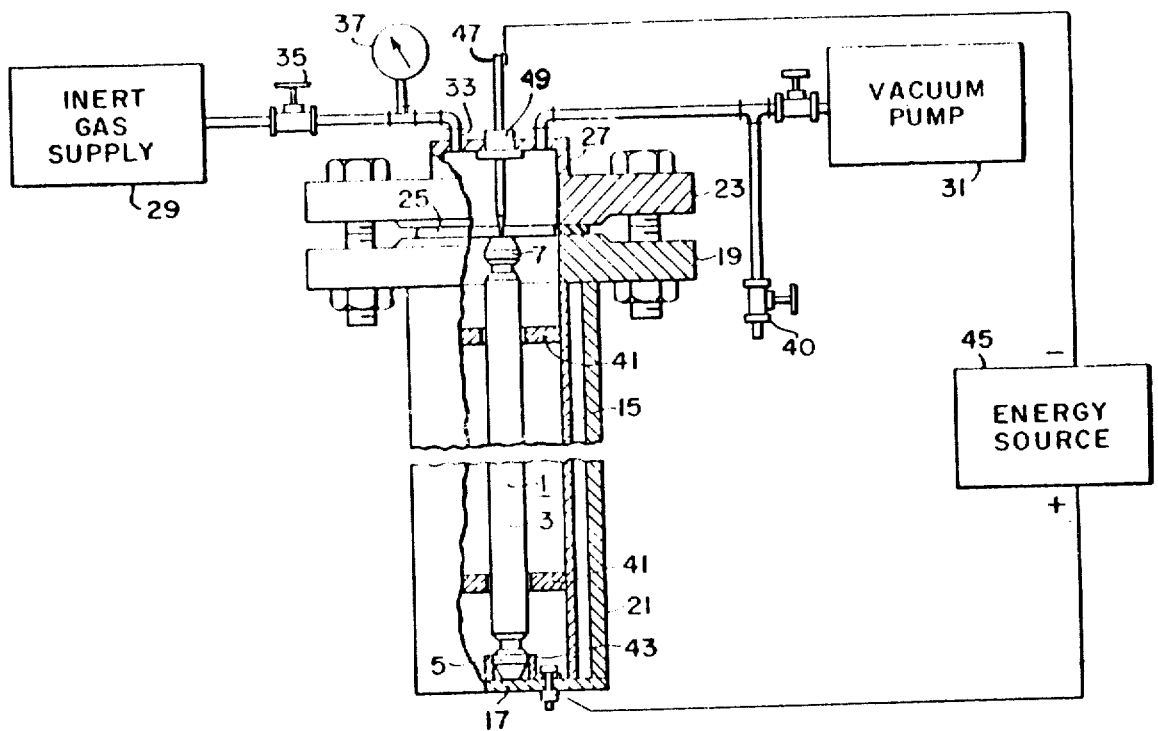
FIG. 1.
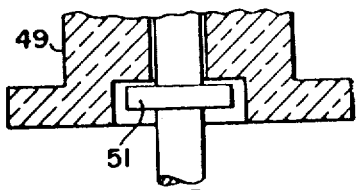
FIG. 2
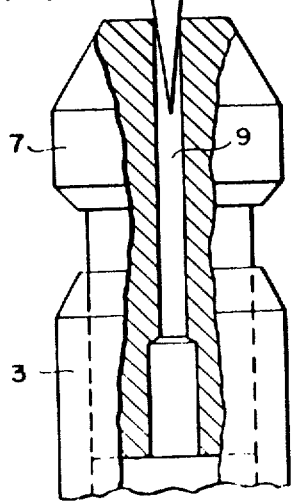
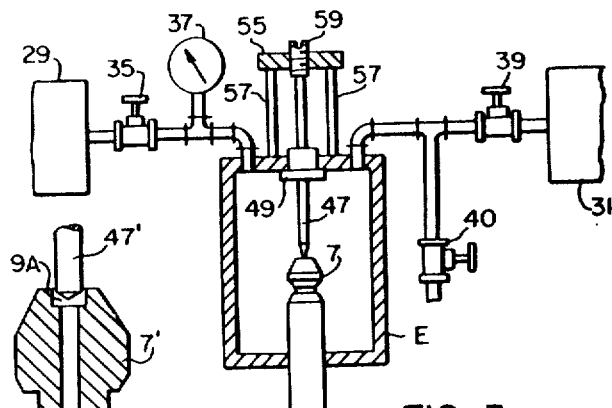
FIG. 3
FIG. 4
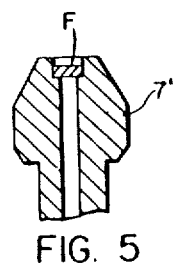
FIG. 5

NUCLEAR FUEL ELEMENTS SEALED BY ELECTRIC WELDING

This is a division of application Ser. No. 96,153 filed Dec. 8, 1970, now U.S. Pat. No. 3,842,238.

BACKGROUND OF THE INVENTION

This invention relates to nuclear fuel assemblies and it has particular relation to apparatus and processes for fabricating nuclear fuel assemblies which are pressurized.

In nuclear reactors it is the practice to employ a plurality of nuclear-fuel assemblies each comprising a tube containing nuclear fuel, the ends of the tube being sealed by plugs. Due to the pressure of the environment in which the assembly is located it is subject to high creep stresses and even to collapse.

DESCRIPTION OF THE PRIOR ART

Heretofore it has been proposed that a fuel assembly be evacuated to a pressure of the order of 0.1 torr and that helium be admitted at a low pressure thereafter to the fuel assembly. While it was in the low pressure helium environment the fuel assembly was then sealed. The purpose of the helium was to increase the heat transfer between the nuclear fuel and the exterior of the fuel container and to enable any leak through the container to be detected by spectrometer inspection. The final sealing was effected by an arc-welding step which produced a circular weld uniting the periphery of a plug to the associated tube.

In the United States patent to Brittaine et al 2,984,734 a wire electrode contacts a readily-oxidized metal such as one containing aluminum or magnesium in the presence of argon and oxygen.

In the United States Stone et al patent 3,045,108 reference is made to the difficulty in making closures for the ends of fuel rods. Mechanical methods such as swaging, crimping, spinning and the like fail to produce leak-proof joints in every case. Seam welding around the perimeter of the end cap where it meets the wall of the tube affects the thin metal of the latter and may cause it to have minute leaks. Flat ends create undesirable turbulence.

Stone et al propose to fuse the entire end of the end cap and the tube end of metals such as stainless steel, aluminum, aluminum alloys, zirconium, zirconium alloys by a combination of resistance and arc heating in an inert atmosphere such as helium, argon, a vacuum or the like. An enclosing vessel may be used but is not shown.

The United States patent to Blake 3,189,101 shows a nuclear-fuel assembly in which the ends of the tube or sheath are swaged over rounded extremities. Hydrogen or helium is employed at several atmospheres pressure. He specifies as a sheath metal an alloy of the "Nimonic" type. He refers to spot welding between the end plugs and the sheath.

The United States patent to Ross et al 3,378,458 is concerned with the deleterious effects of welding heat on end plugs and plenum springs.

The United States patent to Coulter et al 3,392,438 is concerned with the harmful effects of welding heat. As in Blake, the ends of the tube or sheath are swaged to provide almost a continuous enclosure without end plugs by a complicated procedure. The tube is outgassed and filled with helium after which a helium arc spot weld is applied. This patent states that swaging to form a neck is a significant feature of the invention and that it avoids the use of welded end caps.

British patent 1,030,180 discusses several processes for removing residual gases in a nuclear fuel cartridge during the steps of canning. Some approaches use temporary plugs, which are later replaced by permanent plugs. The patent proposes to weld a plug to a can by an annular weld bead. The plug has a small axial passage and is evacuated through a conduit or in a complete vacuum enclosure, or helium may be applied. A pin is forced into the passage as a seal. The cartridge is then disconnected from the evacuating tube and a spot weld is applied.

British patent 896,826 discusses the prior practice of admitting helium at low pressure to the sleeve of a nuclear fuel element in a shroud and the forcing of an end cap into the open end of the sleeve to effect a seal. The shroud is then removed and the cap is seal welded to the sleeve. The patent proposes to place the fuel element in a chamber which is first evacuated and then filled with helium. While in the chamber the fuel element is rotated relative to an electric arc to provide a circular weld sealing the end cap and the main part.

French patent 1,296,865 shows a device for making a circular weld between an end cap and a nuclear fuel tube.

German patent 1,066,287 mentions evacuating a fuel rod, filling with helium, assembling a sealing cap and welding the cap and the casing tube in a chamber. This patent proposes to replace the chamber by a porous gas shield (Porogasschutz). If the end cap has an air-trapping shape the patent recommends that an opening be provided in the cap to eliminate enclosed air.

German patent 1,209,673 discloses a nuclear fuel assembly having an end plug or cap welded on the fuel encasing tube. The cap has a projecting inlet tube and a check valve. After helium is introduced through the inlet tube, the filling equipment is removed and the check valve presumably prevents helium loss. The inlet tube is then squeezed together and a weld bead is applied.

In the application of Boyko et al, Ser. No. 680,863, filed Nov. 6, 1967 abandoned for continuation-in-part 33,156 filed May 5, 1970, and now U.S. Pat. No. 3,683,148, a fuel assembly having a plug with a small bore is disposed in an inert gas under pressure. A welding electrode is spaced from the end plug and energized to seal the bore.

In the copending U.S. patent application of Harry M. Ferrari, Ser. No. 615,542, filed Feb. 13, 1967 and now abandoned, and assigned to the same assignee several pressurizing techniques are mentioned. For example an internal pressure is developed by a thermally-decomposable body located within the sealed fuel assembly during fabrication. When heated the body generates a gas such as carbon dioxide or a mixture or carbon dioxide and monoxide to pressurize the fuel assembly. The fuel assembly may be located in a pressurized water reactor in which the water may have a pressure of the order of 2000 pounds per square inch. Typical dimensions are disclosed by Ferrari.

SUMMARY OF THE INVENTION

In accordance with the invention a plug of a nuclear-fuel assembly is provided with an axial bore providing communication between the exterior and interior of the fuel assembly. The nuclear-fuel assembly is placed in an enclosure which is first evacuated or purged with inert gas for a predetermined period of time and then pressurized by an inert-gas to a substantial pressure such as a pressure in excess of 500 pounds per square inch (gauge). An electric arc welding current then is directed through an electrode having a tapered end in the bore initially in contact with the plug for the purpose of sealing the bore.

BRIEF DESCRIPTION OF THE DRAWING

FIG. 1 is a schematic view with parts shown in elevation and with parts broken away of a nuclear fuel assembly and apparatus for pressurizing such assembly;

FIG. 2 is a detail view in elevation with parts broken away showing one end of a nuclear-fuel assembly and an associated electrode as employed in the system of FIG. 1;

FIG. 3 is a schematic view with parts shown in elevation and with parts broken away of pressurizing and sealing apparatus, and a nuclear-fuel assembly; and FIGS. 4 and 5 are detail views in sectional elevation showing another embodiment of the invention.

DESCRIPTION OF THE PREFERRED EMBODIMENTS

Referring to the drawing FIG. 1 shows an exemplary embodiment of a nuclear-fuel assembly 1 comprising an elongated thin-walled tube 3 which contains nuclear fuel, such as fuel pellets of uranium oxide enriched with U-235. The tube 3 has a plug 5 sealing its lower end and a wall in the form of a plug 7 located adjacent its upper end. The plug 5 may be secured to the tube 3 by means of a circular weld in a manner well understood in the art. The plug 7 is welded similarly to the tube 3.

The tube and plugs may be constructed of a zirconium containing alloy. Such an alloy may contain by weight 1.2 to 1.7% tin, 0.07 to 0.20% iron, 0.05 to 0.15% chromium, 0.03 to 0.08% nickel and 97.87 to 98% zirconium. A specific alloy of this type may contain 1.5% tin, 0.12% iron, 0.10% chromium, 0.05% nickel with the balance being zirconium.

A suitable zirconium alloy containing a low nickel content may contain 1.2 to 1.7% tin, 0.18 to 0.24% iron, 0.07 to 0.13% chromium, 0.007% nickel with the balance being zirconium.

Stainless steel may also be employed for the tube and plugs.

In accordance with the invention the tube 3 and the plugs 5 and 7 are sealed while the tube contains a gas under a high pressure. Pressures in the range of 500 pounds per square inch to 1900 pounds per square inch (gauge) have been employed with good results. As pointed out in the above-mentioned Ferrari application such pressurizing is particularly suitable for fuel assemblies to be employed in pressurized water reactors.

Under the conditions of use the contents of the tube 3 tend to expand. Preferably an initial pressure is selected such that at the end of the life of the nuclear fuel assembly the internal pressure does not exceed 2000 to 2200 pounds per square inch.

As shown in FIG. 2 the plug 7 is provided with an axial small cross-section bore 9 which establishes communication between the exterior and interior of the fuel assembly. The bore may have a small diameter such as 0.04 inch.

In order to pressurize the fuel assembly to a pressure substantially larger than atmospheric pressure, the assembly is placed in a pressurizing enclosure or chamber which includes a steel sleeve 15. The sleeve at its lower end is welded in sealed relationship to a steel disc 17. At its upper end the sleeve 15 is welded around the inner opening of a steel flange 19. As an additional safety measure an outer steel sleeve 21 may surround the sleeve 15 and may be welded to the disc 17 and the flange 19.

The enclosure is completed by a steel ring 23 which is bolted to the flange 19 with a suitable seal 25 located therebetween. The seal 25 may take the form of a highly-polished stainless-steel ring. The ring 23 has its center closed by a steel cup 27.

The enclosure is suitably connected to an inert-gas supply 29 and a vacuum pump 31. In the specific embodiment of FIG. 1, a nipple 33 located in an opening provided in the cup 27 is connected by piping through a valve 35 to the inerert-gas supply 29. A gauge 37 is provided for indicating the pressure within the enclosure.

In a similar manner the cup 27 is connected through a valve 39 to the vacuum pump 31.

A purge valve 40 may be provided. This valve may be opened to connect the interior of the enclosure containing the tube 3 to the atmosphere to permit inert gas from the supply 29 to purge the enclosure.

The fuel assembly 1 is positioned concentrically within the sleeve 15 by means of suitable insulators 41. These insulators may be constructed of any suitable material such as porcelain or a fluorocarbon resin which is available under the trademark "Teflon." The plug 5 is releasably positioned in an electrical socket 43 which is secured to the disc 17 and which is connected through a suitable conductor to the positive terminal of a source of direct current 45.

An electrode 47 extends through an insulating bushing 49 which is secured to the cup 27 and has its lower end positioned adjacent the plug 7. The insulator may be made from a material similar to that employed for the insulators 41. The electrode 47 is connected to the negative terminal of the source 45. In order to assure retention of the electrode in position under the conditions of high pressure to which it is subjected a stainless steel collar 51 is welded to the electrode. In service the collar 51 is located adjacent the lower end of the bushing 49.

It will be noted that the electrode 47 is aligned with the fuel assembly 1. The electrode preferably is constructed of a material similar to that utilized for the plug 7. The electrode preferably has a tapered or conical end extending into the bore of the plug. The taper may be omitted from smaller-diameter wire, but preferably is provided, particularly for larger diameter wire such as 0.090 inch diameter wire.

The pressurizing gas should provide a good atmosphere for welding. Argon, helium, helium-argon mixtures and helium-xenon mixtures are examples of suitable gases and helium is preferred. Helium has the additional advantage that it may be detected in a known manner by spectrometer inspection for the purpose of detecting leaks in the fuel assembly.

A procedure for pressurizing a nuclear fuel assembly now may be described. A loaded fuel assembly is placed within the sleeve 15 with the plug 5 inserted in the electric socket 17. The ring 23 then is bolted to the flange 19 for the purpose of compressing the seal 25 and establishing a completely sealed enclosure for the fuel assembly. If the electrode 47 is threaded through the bushing 49 or is otherwise adjustable it is then adjusted to extend its tapered end into the bore of the plug 5 to establish a circular contact with the plug. It will be assumed for present purposes that the electrode 47 is preset in the bushing 49 to establish the contact. If necessary the enclosure is now connected to the valves 35 and 39.

At this stage the valve 39 is opened and the vacuum pump 31 is operated to evacuate the enclosure to a pressure which may be of the order of 0.1 torr. The valve 39 is now closed and the valve 35 is opened to supply the helium under pressure to the enclosure. The pressure is built up to the desired valve which for example may be of the order of several atmospheres or of the order of 500 pounds per square inch or more. At this stage the valve 35 is closed.

Instead of evacuating the enclosure, the valves 35 and 40 may be opened to purge the enclosure with inert gas for a predetermined period of time. The valve 40 then may be closed to permit build up of the desired inert gas pressure in the enclosure.

An electric voltage is next established between the electrode 47 and the plug 7. Conveniently, such a voltage may be supplied by a conventional direct-current welder with timer control represented by the source 45. The high contact resistance between the pointed electrode and the plug 7 causes rapid heating and subsequent melting of the electrode point. As the electrode melts breaking the metallic welding circuit, an instantaneous high-current arc is formed between the remaining solid electrode and the plug which further melts the electrode tip. Molten electrode material drops into the vent hole and the entire surface below the instantaneous arc is fused. Electrode melt back creates a large gap which extinguishes the arc. Because of the very short duration of the arc it is referred to as "instantaneous". After congealing of the fused material, the completed fuel assembly may be removed from the enclosure. This procedure has been particularly desirable for elevated pressures such as 500 pounds per square inch or more.

The tapered configuration of the electrode end establishes a contact with the plug which is essentially a circle or line contact. This tends to concentrate the resistance heating in the small portions of the electrode and plug required for sealing.

As noted above, the taper could be eliminated from small-diameter electrode wire but is preferred. With no point or taper, and with a substantial contact area, a substantial time may elapse after energization of the welding circuit without formation of a weld.

In the embodiment illustrated in FIG. 1, the entire fuel assembly is located in a pressurizing enclosure. At the time of pressurization the fuel assembly is sealed except for the bore in the plug 7. For this reason it is feasible to limit the pressurizing enclosure to the portion of the fuel assembly containing the plug 7. This is represented in FIG. 3 wherein an enclosure E releasably receives the upper end of a fuel assembly in sealed relationship. This enclosure is connected to the inert gas supply 29 through the valve 35 and to the vacuum pump 31 through the valve 39. The electrode 47 extends through the enclosure E for association with the plug 7 in the same manner shown in FIG. 1. The enclosure may locate the fuel assembly along a vertical axis or a horizontal axis or an inclined axis.

To facilitate adjustment of the electrode 47, preferably a bridge 55 is secured to the enclosure E by struts 57. The upper end of the electrode 47 is secured to a screw adjuster 59 which is in threaded engagement with the bridge 55. By rotation of the screw adjuster 59 the electrode is advanced or retracted relative to the plug 7. The bushing 49 provides a seal which permits sliding movement of the electrode. A similar adjustment feature may be employed for the embodiment of FIG. 1.

With such an adjustment the electrode 47 may be spaced slightly from the plug 7 so that purging or evacuation or pressurizing may be carried out with a substantial clearance between the electrode and the plug. After pressurization, the electrode may then be advanced into contact with the plug, and may establish a complete circular contact with the plug.

If the electrode is in final welding position during the purging, evacuation or pressurization, the contact between the electrode and the plug may be slightly less than a full circle to leave a passage for gas movement between the enclosure and the interior of the fuel assembly.

If the electrode 47 is inserted into the bore 9 in advance of evacuation or pressurizing of the nuclear fuel assembly it should not completely seal the bore. Thus it may be shaped or inserted to establish contact with the plug 7 over part of a circle while leaving clearance through which gas may enter or leave the nuclear fuel assembly. The contact so made is sufficient to permit the above-described resistance heating.

Alternatively the electrode, if adjustable, may be positioned slightly out of contact with the plug and may be advanced into contact with the plug after completion of the pressurizing step.

FIGS. 4 and 5 illustrate a preferred embodiment of the invention. In FIG. 4 the electrode 47' differs from the electrode 47 of FIG. 3 only in the shape of the tip which in FIG. 4 is blunter. Thus in FIG. 4 the tip may be in the form of a cone having a 90° apex angle.

In FIG. 4 the plug 7' corresponds to the plug 7 of FIG. 3. The plug 7' also has an axial bore 9' with a diameter of the order of 0.040 inch, but in addition it has an axial counterbore 9A having a diameter larger than that of the electrode. Thus the counterbore may have a diameter of 0.125 inch and a depth sufficient to receive a substantial part of the electrode tip, such as a depth of 0.080 inch.

In operation, a nuclear fuel assembly having the plug 7' is associated with the enclosure E in the same manner discussed for the nuclear fuel assembly of FIG. 3. The electrode 47' is employed in place of the electrode 47. The electrode 47' is adjusted downwardly as viewed in the drawing until the tip engages the bottom of the counterbore 9A. The electrode then is adjusted upwardly, say for 0.20 inch to establish an air gap.

The nuclear fuel assembly is next evacuated and pressurized in the manner previously discussed. A suitable welding voltage then is applied in a conventional manner between the electrode 47' and the plug 7' to establish an arc which may substantially fill the space between the electrode tip and the counterbore. Thus the arc may be started by superimposing a high-frequency voltage on the direct welding voltage in the energy source. The heat generated by the arc assures fusion of the tip of the electrode in the counterbore and the welding of the filler metal F derived from the tip to the plug 7' to seal the bore 9' as shown in FIG. 5.

We claim as our invention:
1. A nuclear fuel unit which comprises a tubular container having a first end sealed and having a second end sealed except for a stepped opening extending from the interior to the exterior of the container and nuclear fuel disposed within the container, said stepped opening having a first portion with a first cross section adjacent the outer end of the opening and a second portion having a second cross section smaller than the first cross section which extends from the first portion towards the interior of the container, a gas under a pressure of a plurality of atmospheres located within the container, a welding filler metal located in the first portion of the opening and disposed in sealing engagement therewith, said welding filler metal having been formed by positioning a fusible welding electrode within the opening in a manner to make essentially line contact with a portion of the opening and the fusible electrode, directing sufficient current through said electrode, line contact and wall containing the opening to fuse the electrode by resistance heating and continuing said heating by arc discharge until the desired amount of weld filler material seals said opening.

* * * * *